May 10, 1938.  V. I. CRUSER  2,116,562
SOLDERING IRON
Filed July 2, 1935
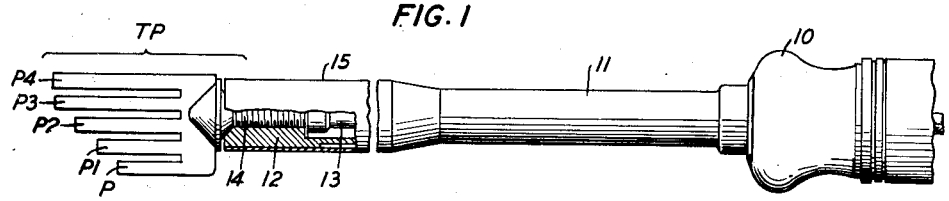
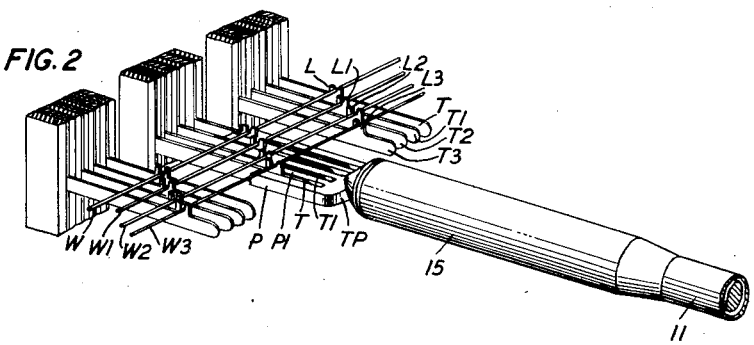
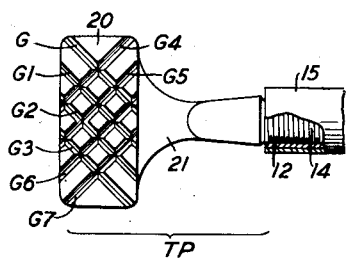
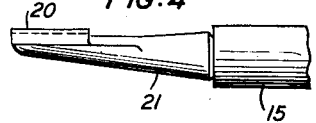
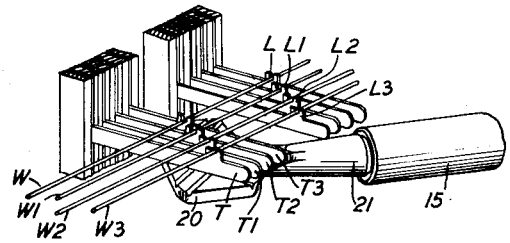
INVENTOR
V. I. CRUSER
BY
J. MacDonald
ATTORNEY Patented May 10, 1938

2,116,562

UNITED STATES PATENT OFFICE 2,116,562

SOLDERING IRON

Victor I. Cruser, East Orange, N. J., assignor to Bell Telephone Laboratories, Incorporated, New York, N. Y., a corporation of New York Application July 2, 1935, Serial No. 29,440

2 Claims. (Cl. 219—26)

This invention relates to electrically heated tools and more particularly to soldering coppers.

In telephone exchanges so-called cross-bar switches are used wherein sets of closely spaced contact springs are arranged in horizontal rows multipled in staggered relation in each row by a set of closely spaced wires which extend at right angles thereto. These sets of conducting elements are joined by soldered connections which are effected one by one by the use of an ordinary mono-pointed soldering tool.

The use of such a tool, however, to effect such a great quantity of soldered connections has been found to take much time and is, therefore, costly.

The object of the invention is to provide a soldering tool which will be simple, efficient in use and wherein two sets of intersecting conducting elements may be joined by soldering in a single heating operation.

According to this invention, an electrically heated tool is provided with a specially formed heat applying tip having means for collectively engaging the conducting elements to be joined by soldered connections, the heat being applied nearest to the intersecting points of the conducting elements where the solder is applied, with means whereby the supporting element of the heat applying means is orientated in a direction to give maximum convenience to the operator for effecting such soldered connections.

Other features of the invention and advantages will appear from the following description and by the claims appended thereto, reference being had to the accompanying drawing in which:

Fig. 1 is an assembly view showing the heat applying tip of the invention and its support with a number of operating parts in section;

Fig. 2 is a perspective view showing the tool in position for collectively heating the intersecting conductors;

Fig. 3 is a front view of a modification of the tool shown in Fig. 1;

Fig. 4 is a side view thereof; and

Fig. 5 is a perspective view showing the modified tool in engaged relation with the conductors.

In the soldering tool of the invention as shown in Fig. 1 of the drawing, 10 is a handle fitted at one end of a tubular support 11. This support is provided at its opposite end with an enlarged portion 15 for receiving a bushing 12 and a heating element 13 in concentric relation with respect to each other with the heating element disposed in end-to-end contacting relation with the screw threaded portion 14 of a fork-shaped heat applying tip TP engaging the bushing 12.

The prongs P, P1, P2, P3, and P4 of the heat applying tip TP are of a width to fit between the terminals T, T1, T2, and T3 with their ends extending in juxtaposition with respect to the diagonally disposed row of lugs L, L1, L2, and L3 integrally formed with the terminals T, T1, T2, T3 as shown in Fig. 2.

The screw-threaded portion 14 of the tip TP is disposed out of alignment from the middle longitudinal line of the group of prongs P, P1, P2, P3, and P4 in order to provide heat conducting paths of equal length from the longitudinal axis of the threaded portion 14 to the lugs L, L1, L2, L3, that is, the intersecting points of conductors T, T1, T2, and T3 with the wires W, W1, W2, and W3 where the heat is conducted for heating these conductors collectively preparatory to the soldering operation.

While the prongs P, P1, P2, P3 and P4 are shown in axial relation with the screw-threaded portion 14, these prongs may be disposed to form any desired angle with the screw-threaded portion as to orientate the support in any convenient direction with respect to the position of the user.

In the modification shown in Figs. 3, 4, and 5, the heat applying tip TP is in the form of a rectangularly shaped plate 20 formed integrally with the shank portion 21 which, like the heat applying tip shown in Fig. 1, has a screw-threaded portion 14 for engaging the sleeve 12 in the tubular support 15. In the face of plate 20 opposite the shank portion 21 there is provided a plurality of diagonally disposed grooves G, G1, G2, and G3 which correspond in number to that of the terminals T, T1, T2, and T3, these grooves assisting in locating the tip plate 20 in engaged relation with the terminals T, T1, T2, and T3 as shown in Fig. 5 and their diagonal relation is such as to orientate the support 15 in a convenient direction with respect to the position of the user while the set of grooves G4, G5, G6, and G7 permits the orientation of the tip support substantially 90 degrees to that of the position shown in Fig. 5 for heating terminals in which the lugs L, L1, L2, and L3 carried thereby are disposed in staggered relation at right angles to the position shown in Figs. 2 and 5.

It is to be understood that minor changes may be made to the heat applying tip of this invention as to shape, size, and the number of grooves and prongs depending upon the location and shape of the lug portions with their connecting wires without departing from the spirit and scope of the appended claims.

What is claimed is:

1. In a soldering tool, the combination with a support provided at one end with a handle and at its opposite end with fastening means and a heating element, of a tip having a portion for engaging said fastening means and adapted to be heated by said heating element, said tip having a portion formed with a plurality of parallelly disposed heat applying members of different lengths for collectively engaging sets of criss-crossing conducting elements adjacent to their intersecting points for joining them by soldering, the distance from the first-mentioned portion of said tip to each of said heat applying portions being substantially equal.

2. In a soldering copper, the combination with a heating element and a supporting member therefor, of a heating tip formed at one end with a portion for engaging said heating element and at its other end with a plurality of heat transferring portions extending from the first-mentioned portion in parallel relation to each other for simultaneously engaging sets of terminal strips each having a lug which projects at a different point from its terminal to form a substantially diagonal row and each lug having a groove to set a wire at right angles to said strips, said applying means collectively engaging said strips for collectively heating said wires and strips.

VICTOR I. CRUSER.